United States Patent [19]

Ruhl et al.

[11] Patent Number: 4,999,778
[45] Date of Patent: Mar. 12, 1991

[54] METHOD AND APPARATUS FOR DETERMINING SLIP THRESHOLDS FOR A PROPULSION SLIP CONTROL SYSTEM OF A MOTOR VEHICLE

[75] Inventors: Thomas Ruhl, Waiblingen-Hegnach; Armin Müller, Backnang; Wolfgang Hinrichs, Stuttgart, all of Fed. Rep. of Germany

[73] Assignee: Daimler-Benz AG, Fed. Rep. of Germany

[21] Appl. No.: 280,000

[22] Filed: Dec. 5, 1988

[30] Foreign Application Priority Data

Dec. 5, 1987 [DE] Fed. Rep. of Germany ....... 3741248

[51] Int. Cl.⁵ .............................................. B60T 8/32
[52] U.S. Cl. ............................ 364/426.02; 180/197; 303/100
[58] Field of Search ............... 364/426.02, 426.03; 180/197; 303/100, 102, 103, 106

[56] References Cited

U.S. PATENT DOCUMENTS

| 4,321,677 | 3/1982 | Takahashi et al. | 364/426.02 |
| 4,392,202 | 7/1983 | Matsuda | 364/426.02 |
| 4,665,490 | 5/1987 | Masaki et al. | 364/426.02 |
| 4,715,662 | 12/1987 | Van Zanten et al. | 303/100 |
| 4,794,538 | 12/1988 | Cao et al. | 180/197 |
| 4,862,368 | 8/1989 | Kost et al. | 303/100 |

*Primary Examiner*—Gary Chin
*Attorney, Agent, or Firm*—Evenson, Wands, Edwards, Lenahan & McKeown

[57] ABSTRACT

Method of and apparatus for determining slip thresholds for a propulsion slip control system of a motor vehicle, whereby the instantaneously effective coefficient of friction between vehicle and road is determined from the measured values of vehicle speed and of the vehicle longitudinal acceleration and a slip value is associated therewith as a threshold value for the propulsion slip control system.

3 Claims, 2 Drawing Sheets

METHOD AND APPARATUS FOR DETERMINING SLIP THRESHOLDS FOR A PROPULSION SLIP CONTROL SYSTEM OF A MOTOR VEHICLE

BACKGROUND AND SUMMARY OF THE INVENTION

The present invention relates to a method and apparatus for determining slip thresholds for a propulsion slip control system to prevent the undesirable slipping of driven wheels of a motor vehicle, wherein the circumferential speed of each vehicle wheel is sensed and a vehicle speed and acceleration signal is derived therefrom along with slip signals for each driven vehicle wheel. The vehicle speed and acceleration signals are used to define a predetermined threshold value which is compared with the slip signals from each driven vehicle wheel for controlling the torque output of the motor vehicle.

German Offenlegungsschrift No. 3,545,652 discloses a device for controlling torque output in response to slip threshold value signals. In this device, a mean slip threshold is substituted by a lower value, when the vehicle travels faster than a predetermined speed in a curve and the vehicle longitudinal acceleration is within a specific range, for providing a propulsion slip control for the vehicle. Conversely, the means slip threshold is substituted by a higher value when the vehicle likewise travels in a curve and the vehicle longitudinal acceleration is above the above-mentioned range. An adaptation of the slip threshold to the stability required for travelling curves is therefore detectable in a sense when travelling curves. The coefficient of friction, i.e., the grip of the vehicle relative to the nature of the road just being traveled, is left out of consideration, so that a changeover is made to a lower slip threshold value in the case of dry gripping road, for example, although this is not actually necessary if the actual coefficient of friction of the road was considered.

A similar device is known from the non-prior published German Patent Application No. P 3,728,574.2, in which a raising of a slip threshold is performed when this slip threshold is exceeded by at least one driven wheel and the vehicle is simultaneously accelerating. This document says nothing as to the conditions for or the execution of a lowering of the slip threshold. In this device, and also partly in the one previously mentioned, a variation of the slip threshold is performed only when the prescribed slip threshold has already been exceeded and the propulsion slip control system is already in operation. It is therefore first determined if the prescribed slip threshold is obviously too low because the vehicle is still accelerating in spite of the operation of the propulsion slip control system, and only then is a prescribed higher slip threshold applied. This will only correspond to the optimum conditions in the rarest of cases, because it does not take into consideration the instantaneous grip of the road.

Constant slip thresholds which had to be matched to the least favorable case, i.e., smooth ice, have hitherto been used. However, these slip thresholds are too low for a higher coefficient of friction, so that only low accelerations are then possible and the propulsion slip control system is frequently switched on unnecessarily.

It is therefore the object of the present invention to provide a method which is capable of prescribing slip values which correspond to the instantaneous grip of the road and thus create optimum conditions as regards traction and stability for the briefest possible control action. By this thresholds are high, that is to say control only starts when the threshold is exceeded and is switched off again early. It is also an object of the invention to produce an apparatus for performing this method.

This objective obtained wherein the predetermined threshold value is defined by a specific curve plotting attainable acceleration from vehicle standstill ($V_F=0$) as a function of the coefficient of friction ($\mu$) determined for the respective type of vehicle and taking into consideration the resistances to motion which are a function of the vehicle speed ($V_F$), and wherein the specific curve is extended to form a graph of the coefficient of friction ($\mu$) as a function of the vehicle speed ($V_F$) and of the vehicle acceleration ($a_x$), and wherein a predetermined slip threshold value ($\gamma_s$) is associated with each coefficient of friction ($\mu$) determined from the graph.

It is possible by this method to determine the instantaneously effective coefficient of friction and to associate with the latter a slip threshold value which can serve as a guide quantity for the propulsion slip control system.

Further particulars will be found in the following description of the method according to the invention, and of an exemplary embodiment of an apparatus for performing this method. These and other objects, advantages and novel features of the present invention will become apparent from the following detailed description of the invention when considered in conjunction with the accompanying drawings.

DETAILED DESCRIPTION OF THE DRAWINGS

Figure 1:
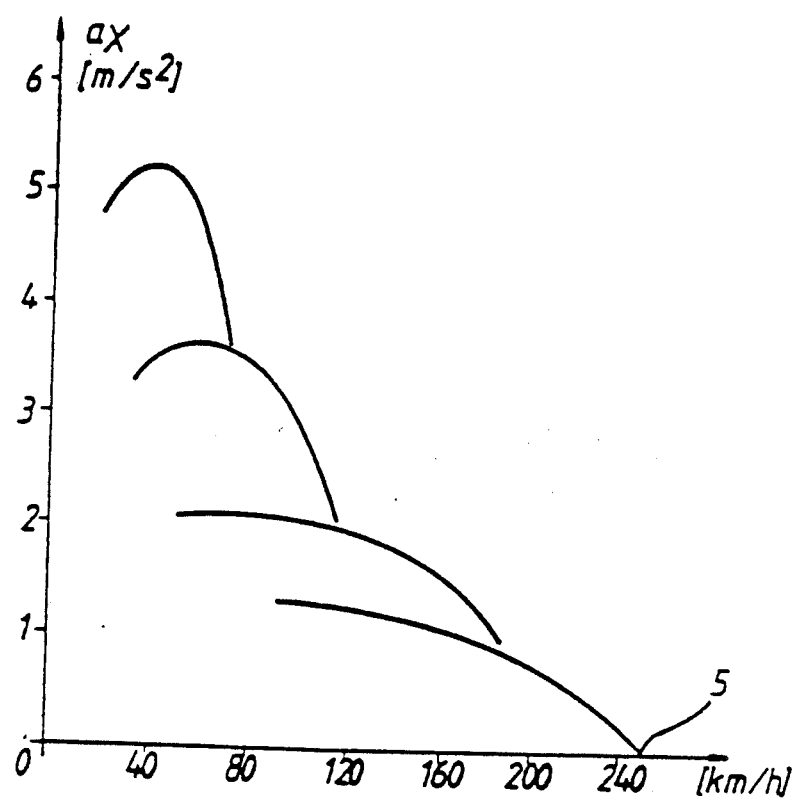
FIG. 1 shows a road performance graph.

FIG. 1 shows a road performance graph for a specific type of motor vehicle which can be determined empirically by experiments, or calculated from known vehicle quantities with specific simplifications using a physical model of a stable rigid two-wheeler. It will be seen from this road performance graph what values of vehicle longitudinal acceleration (plotted on the ordinate) are attainable in the individual gears for a specific vehicle speed (plotted on the abscissa) with the engine under full load.

Figure 3:
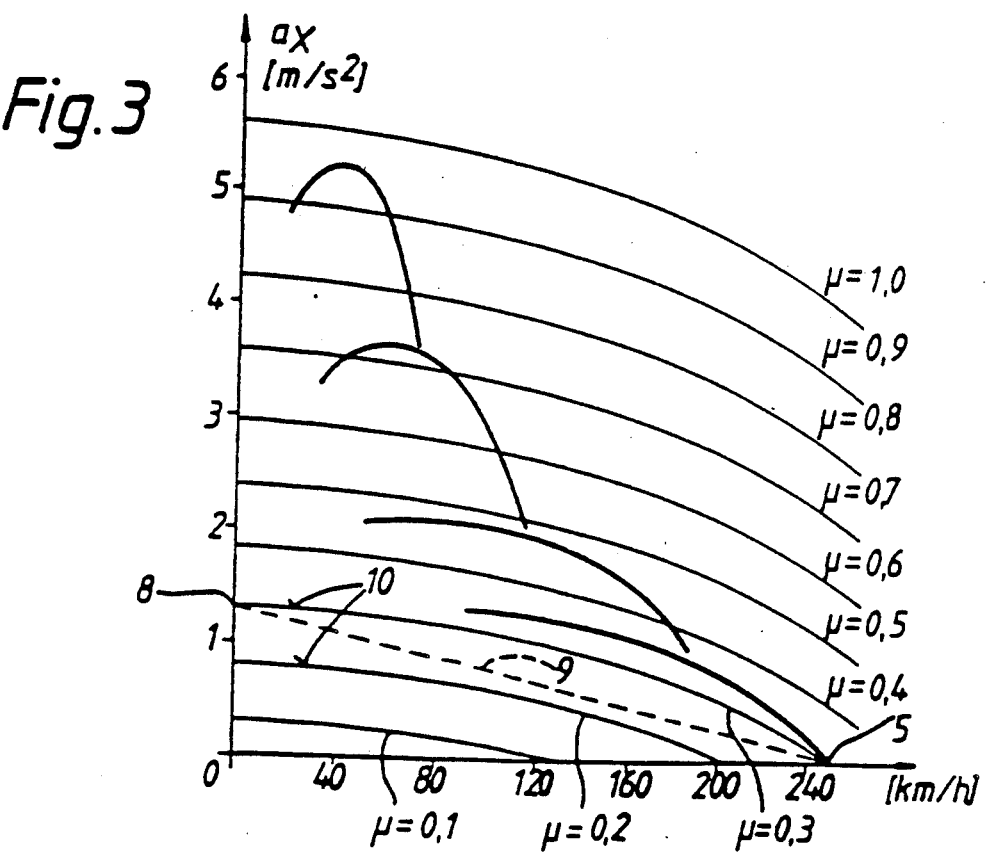
FIG. 3 shows a road performance/coefficient of friction graph prepared from the two graphs according to FIGS. 1 and 2.

Using the same physical model of a stable two-wheeler, it is also possible to calculate, for the specific type of motor vehicle, the vehicle longitudinal acceleration attainable from vehicle standstill as a function of the coefficient of friction between vehicle and road. The result of this calculation is the curve 1 shown in FIG. 2. Since it is only valid for the vehicle speed $V_F=0$ km/h, it passes through the origin of the system of coordinates. Resistances to motion therefore do not occur. If the resistances to motion (rolling resistance, air resistance, etc.) are taken into consideration in the calculation, then the curves 2 (marked in FIG. 2) are obtained, which are shown only for some discrete speeds up to the maximum vehicle speed $V_F$max. The increase in the speed is indicated by an arrow. This family of curves is bounded by a dash-line curve 3 which is obtained from the road performance graph in FIG. 1, and indicates the maximum vehicle longitudinal acceleration which is attainable at the respective vehicle speed. It is clear from this that the maximum acceleration is only obtainable from vehicle standstill with the optimum coefficient of friction (point 4) and that no further acceleration is possible at vehicle maximum speed ($V_F$) (point 5). However, the minimum coefficient of friction which is required in order to attain a specific vehicle speed can also be read off from this graph. This value can be read off on the abscissa, where the curve 2 associated with the desired vehicle speed intersects or touches it. The two graphs according to FIGS. 1 and 2 can now be mutually combined to produce a road performance/coefficient of friction graph as shown in FIG. 3.

Figure 2:
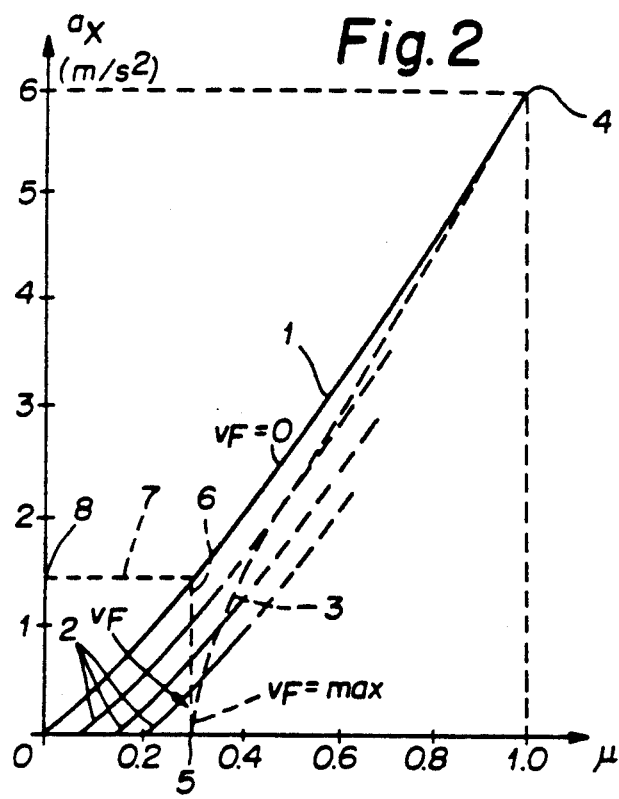
FIG. 2 shows a graph of the attainable vehicle longitudinal acceleration as a function of the coefficient of friction.

Two different points with the same coefficient of friction can be found in FIG. 2, namely, for a specific constant vehicle speed and for the vehicle standstill. For example, at vehicle maximum speed at point 5, the minimum coefficient of friction is approximately $\mu=0.3$. With this coefficient of friction a maximum vehicle longitudinal acceleration from vehicle standstill of approximately $a_x=1.4$ m/s$^2$ is attainable (lines 6, 7 and point 8). If these two points are transferred into the road performance graph (in FIG. 1) and joined together (FIG. 3) as points 5 and 8 and dash-line 9, then this line 9 approximately gives a curve of constant coefficient of friction or constant grip, and the graph becomes a road performance/coefficient of friction graph. The curves of constant grip are only straight lines when simplified, whereas in actuality they are curved lines 10. They can be determined for the entire graph and are shown in FIG. 3. Thus, a definite coefficient of friction is associated with every point of this graph, the coordinates of which are composed of a specific value of the vehicle speed $V_F$ and a specific value of the vehicle acceleration $a_x$.

Figure 4:
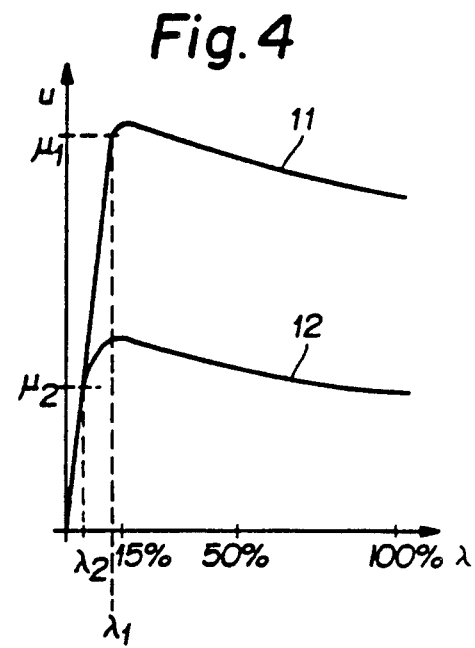
FIG. 4 shows a graph with various coefficient of friction/slip curves.

FIG. 4 shows a graph with two coefficient of friction/slip curves, in which curve 11 is intended to correspond to a gripping dry road and curve 12 to a wet road. From this curve pattern, shown somewhat idealized, it is possible insofar as the rising branches of the curves are concerned, to derive a linear relationship between coefficient of friction and wheel slip, so that on this assumption a slip value can be associated with every coefficient of friction determined by the road performance/coefficient of friction graph from FIG. 3 ($\mu_1 \rightarrow \Gamma_1$; $\mu_2 \rightarrow \Gamma_2$). This slip value, or a somewhat higher value associated with it, can be plotted in the road performance/coefficient of friction graph (FIG. 3) as slip threshold value $\Gamma s$ instead of the corresponding coefficient of friction.

By including further input quantities, such as steering angle, vehicle weight, throttle valve flap position, accelerator pedal position, gear position, converter characteristic, etc., this graph can now be extended into a general operating graph, by which even better adaptation of the control system to road conditions such as upward gradient, downward gradient, deep snow, driving with snow chains, load state, trailer operation, etc., is possible.

Figure 5:
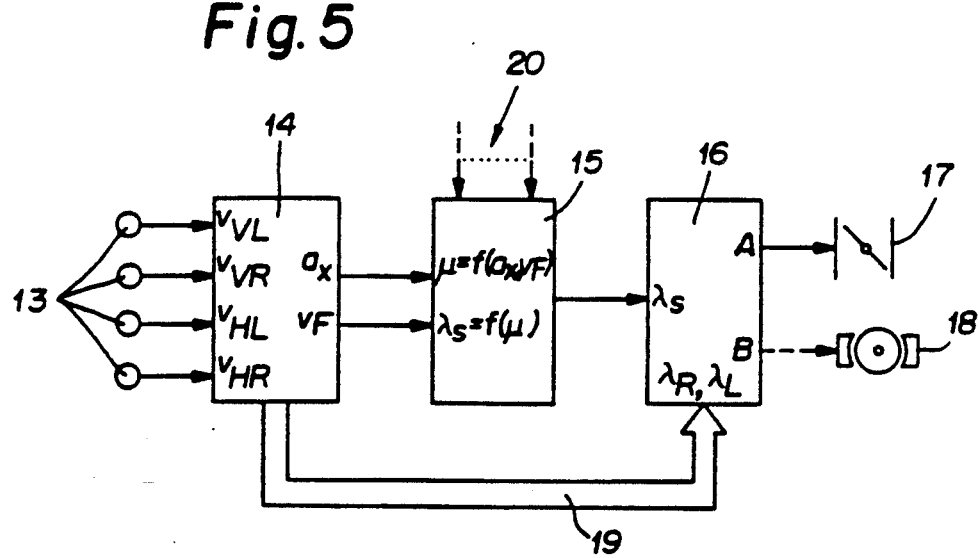
FIG. 5 shows a diagrammatic exemplary embodiment of an apparatus for performing the method according to the invention.

A diagrammatic exemplary embodiment of an apparatus for performing the method according to the invention is shown in FIG. 5. The numeral 13 designates speed sensors of the four vehicle wheels which deliver signals associated with the wheel speeds and wheel circumferential speeds $V_{VL}$, $V_{VR}$, $V_{HL}$, $V_{HR}$ of the left and right front and rear wheels to an electronic circuit 14 which calculates from them, the vehicle speed $V_F$, vehicle longitudinal acceleration $a_x$ and the slip values $\Gamma_R \Gamma_L$ of the driven wheels.

The numeral 15 designates a stored graph to which the vehicle speed $V_F$ and the vehicle longitudinal acceleration $a_x$ are fed as input quantities and which outputs a slip threshold value $\Gamma s$ associated with these input quantities to a propulsion slip control system 16. The slip values $\Gamma_L$ and $\Gamma_R$ of the driven wheels are fed from the electronic circuit 14 to the propulsion slip control system 16 via a line 19, to be compared in a manner known per se with the slip threshold value $\Gamma s$, whereupon control commands A and B of propulsion torque are outputted for the engine throttle 17 and the brakes 18 of the driven wheels, if the latter are PSC-controlled.

An extension of the graph into a general operating graph as described above is indicated by dash-line arrows 20 for further input quantities. In this way, the slip threshold value $\Gamma s$ indicated by the graph 15 can be better adapted to these input quantities.

The coefficient of friction $\mu$ determined from the graph serves principally to control the propulsion slip by action on the propulsion torque through the throttle valve flap position 17. In the case of a PSC regulation after the prescribed slip threshold value $\Gamma s$ has been exceeded by a driven wheel, a throttle valve flap return (or reduction) occurs. The following reopening of the throttle flap and/or its speed can be influenced by the coefficient of friction determined by other parameters: the higher the coefficient of friction determined, the more rapidly is the throttle flap reopened and/or braking torque is canceled and vice versa. This may occur continuously or by steps.

An apparatus operating according to the described method has been tested in road trials and produced definite improvements as regards traction and stability compared to a known propulsion slip control system, not only when travelling straight ahead, but also when travelling curves. When travelling a curve at curve limit speed, the throttle valve flap is controlled back (reduced) due to diminishing vehicle longitudinal acceleration by the slip thresholds being reduced. The vehicle therefore travels through the curve with less propulsion slip and thereby becomes more stable.

Because existing road performance graphs can be referred to for each type of vehicle, it is also possible by the method described to rationalize road dynamics studies and to assess the trend of internal logic parameters.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method of determining a slip threshold for actuating a propulsion slip control of a multi wheeled motor vehicle to prevent undesirable slipping of driven wheels of said motor vehicle by comparison of a slip of said driven wheels with an appropriate predetermined slip threshold value, including the following steps:

sensing circumferential speed of each of the vehicle wheels and producing a vehicle speed signal and a vehicle acceleration signal;

determining the said slip of the said driven wheels utilizing the sensed vehicle speed signal;

determining the predetermined slip threshold value by creating a specific curve through plotting a coefficient of friction ($\mu$) between said driven wheels and a roadway as a function of attainable acceleration ($a_x$) of the vehicle from vehicle standstill ($V_F=0$) and said vehicle speed ($V_F$) signal, with resistances to vehicle motion being taken into consideration in creating the specific curve;

utilizing the said specific curve to form a graph of the said coefficient of friction ($\mu$) as a function of the said vehicle speed ($V_F$) signal and said attainable acceleration ($a_x$) signal to obtain said appropriate predetermined slip threshold value ($\lambda_s$) based on the coefficient of friction ($\mu$) determined from the graph;

comparing a slip signal of each said driven vehicle wheel with the appropriate predeterminable slip threshold value ($\lambda_s$) determined above; and actuating the propulsion slip control on the basis of said comparison to control a drive torque of the vehicle.

2. Method according to claim 1, wherein the appropriate predetermined slip threshold value ($\mu_s$) is determined as a function of a selected coefficient of friction ($\mu$).

3. Method according to claim 1, wherein the graph is created utilizing further input quantities of at least one of steering angle, vehicle weight, throttle flap angle, accelerator pedal position, gear position, and converter characteristic to form a general vehicle operating graph.

* * * * *